United States Patent
Iyer et al.

(10) Patent No.: US 10,937,192 B2
(45) Date of Patent: Mar. 2, 2021

(54) RESOLVING INCORRECT DISTRIBUTED SIMULTANEOUS LOCALIZATION AND MAPPING (SLAM) DATA IN EDGE CLOUD ARCHITECTURES

(71) Applicant: Dell Products, L.P., Round Rock, TX (US)

(72) Inventors: Vivek Viswanathan Iyer, Austin, TX (US); Michael S. Gatson, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 47 days.

(21) Appl. No.: 16/425,656

(22) Filed: May 29, 2019

(65) Prior Publication Data

US 2020/0380719 A1   Dec. 3, 2020

(51) Int. Cl.
*G06T 7/73* (2017.01)
*G01C 21/32* (2006.01)
(Continued)

(52) U.S. Cl.
CPC ............... *G06T 7/74* (2017.01); *G01C 21/32* (2013.01); *G02B 27/017* (2013.01); *G06T 7/337* (2017.01);
(Continued)

(58) Field of Classification Search
CPC ...... G01C 21/005; G01C 21/165; G01C 3/14; G01C 21/32; G02B 27/017; G06F 1/163;
(Continued)

(56) References Cited

U.S. PATENT DOCUMENTS 8,296,434 B1 * 10/2012 Miller ................. H04L 67/1029
   709/226
10,482,677 B1 * 11/2019 Iyer ...................... G06K 9/3241
(Continued)

OTHER PUBLICATIONS

Riisgaard, et al., "SLAM for Dummies," a Tutorial Approach to Simultaneous Localization and Mapping, 127 pages, retrieved Aug. 22, 2018, available at https://ocw.mit.edu/courses/aeronautics-and-astronautics/16-412j-cognitive-robotics-spring-2005/projects/1aslam_blas_repo.pdf.
(Continued)

*Primary Examiner* — Ian L Lemieux
(74) *Attorney, Agent, or Firm* — Fogarty LLP

(57) ABSTRACT

Embodiments of systems and methods for resolving incorrect distributed Simultaneous Localization and Mapping (SLAM) data in edge cloud architectures are described. In some embodiments, a method may include: receiving a first plurality of landmarks usable to produce a first map of a physical space for a first Head-Mounted Device (HMD) and selecting a first set of golden references; receiving, from an Information Handling System (IHS) coupled to a second HMD, a second set of golden references usable to produce a second map of the physical space for the second HMD; determining that a first instance of a given golden reference in the first set of golden references matches a second instance of the given golden reference in the second set of golden references; and in response to the first and second instances of the given golden reference being distant from each other by a threshold, produce a new first map.

18 Claims, 9 Drawing Sheets

(51) Int. Cl.
  *G06T 7/33* (2017.01)
  *G02B 27/01* (2006.01)
  *G06T 17/05* (2011.01)
(52) U.S. Cl.
  CPC .... *G06T 17/05* (2013.01); *G06T 2207/30244* (2013.01)
(58) Field of Classification Search
  CPC .................. G06F 16/29; G06F 16/909; G06T 2207/30204; G06T 2207/30244; G06T 7/74; G06T 7/337; G06T 17/05; G06N 5/046
  See application file for complete search history.

(56) References Cited

U.S. PATENT DOCUMENTS

| | | | | |
|---|---|---|---|---|
| 2012/0230550 | A1* | 9/2012 | Kraut | G05D 1/024 382/113 |
| 2014/0267234 | A1* | 9/2014 | Hook | G06T 19/006 345/419 |
| 2015/0334631 | A1* | 11/2015 | Patil | H04L 45/26 380/270 |
| 2017/0330387 | A1* | 11/2017 | Dearman | G06F 3/012 |
| 2018/0307303 | A1* | 10/2018 | Powderly | G02B 27/0179 |
| 2018/0321894 | A1* | 11/2018 | Paulovich | G03H 1/2249 |
| 2020/0126252 | A1* | 4/2020 | Iyer | G06T 7/74 |

OTHER PUBLICATIONS

Joan Sola, "Simulataneous localization and mapping with the extended Kalman filter," Oct. 5, 2014, 35 pages, available at http://www.iri.upc.edu/people/jsola/JoanSola/objectes/curs_SLAM/SLAM2D/SLAM%20course.pdf.
Zia, et al., "Comparative Design Space Exploration of Dense and Semi-Dense SLAM," Mar. 3, 2016, 9 pages, available at https://arxiv.org/pdf/1509.04648.pdf.
Tang, et al., "Embedded Systems Architecture for SLAM Applications," 4 pages, publisher IEEE, retrieved Aug. 22, 2018, available at https://arxiv.org/ftp/arxiv/papers/1702/1702.01295.pdf.
Occipital, "Structure Core—High-performance depth sensing for any device," 6 pages, retrieved Oct. 31, 2018, available at http://www.occipital.com (structuredcoremodule).
Egodagamage, et al., "Distributed Monocular SLAM for Indoor Map Building," Journal of Sensors, vol. 2017, Article ID 6842173, 2017, 6 pages, retrieved Aug. 22, 2018, available at https://www.hindawi.com/journals/s/2017/6842173/.
Nettleton, et al., "Decentralised SLAM with Low-Bandwidth Communication for Teams of Vehicles," Jul. 7, 2006, pp. 179-188, Publisher, Springer, Berlin, Heidelberg, retrieved Aug. 22, 2018, available at https://link.springer.com/chapter/10.1007%2F10991459_18#citeas.
Robert Collins, "Lecture 12: Camera Projection," Reading: T&V Section 2.4, CSE486, Penn State, 34 pages, retrieved Nov. 20, 2018, available at http://www.cse.psu.edu/~rtc12/CSE486/lecture12.pdf.
ResearchGate, "Intrared marker-based tracking in an indoor unknown environment for augmented reality applications," in Proceedings of SPIE—the International Society for Optical Engineering 7513, DOI: 10.1117/12.839662, Nov. 2009, 10 pages, retrieved Mar. 6, 2019, available at https://www.researchgate.net/publication/252410108_Infrared_marker-based_tracking_in_an_indoor_unknown_environment_for_augmented_reality_applications.
Boyapalle, et al., U.S. Appl. No. 16/105,083, "Colloboration Between Head-Mounted Devices (HMDs) in Co-Located Virtual, Augmented, and Mixed Reality (xR) Applications," filed Aug. 20, 2018.
Iyer, et al., U.S. Appl. No. 16/105,128, "Head-Mounted Devices (HMDs) Discovery in Co-Located Virtual, Augmented, and Mixed Reality (xR) Applications," filed Aug. 20, 2018.
Iyer, et al., U.S. Appl. No. 16/113,007, "Context-Aware Hazard Detection Using World-Facing Cameras in Virtual, Augmented, and Mixed Reality (xR) Applications," filed Aug. 27, 2018.
Iyer, et al., U.S. Appl. No. 16/197,064, "Distributed Simultaneous Localization and Mapping (SLAM) in Virtual, Augmented, and Mixed Reality (xR) Applications," filed Nov. 20, 2018.

* cited by examiner

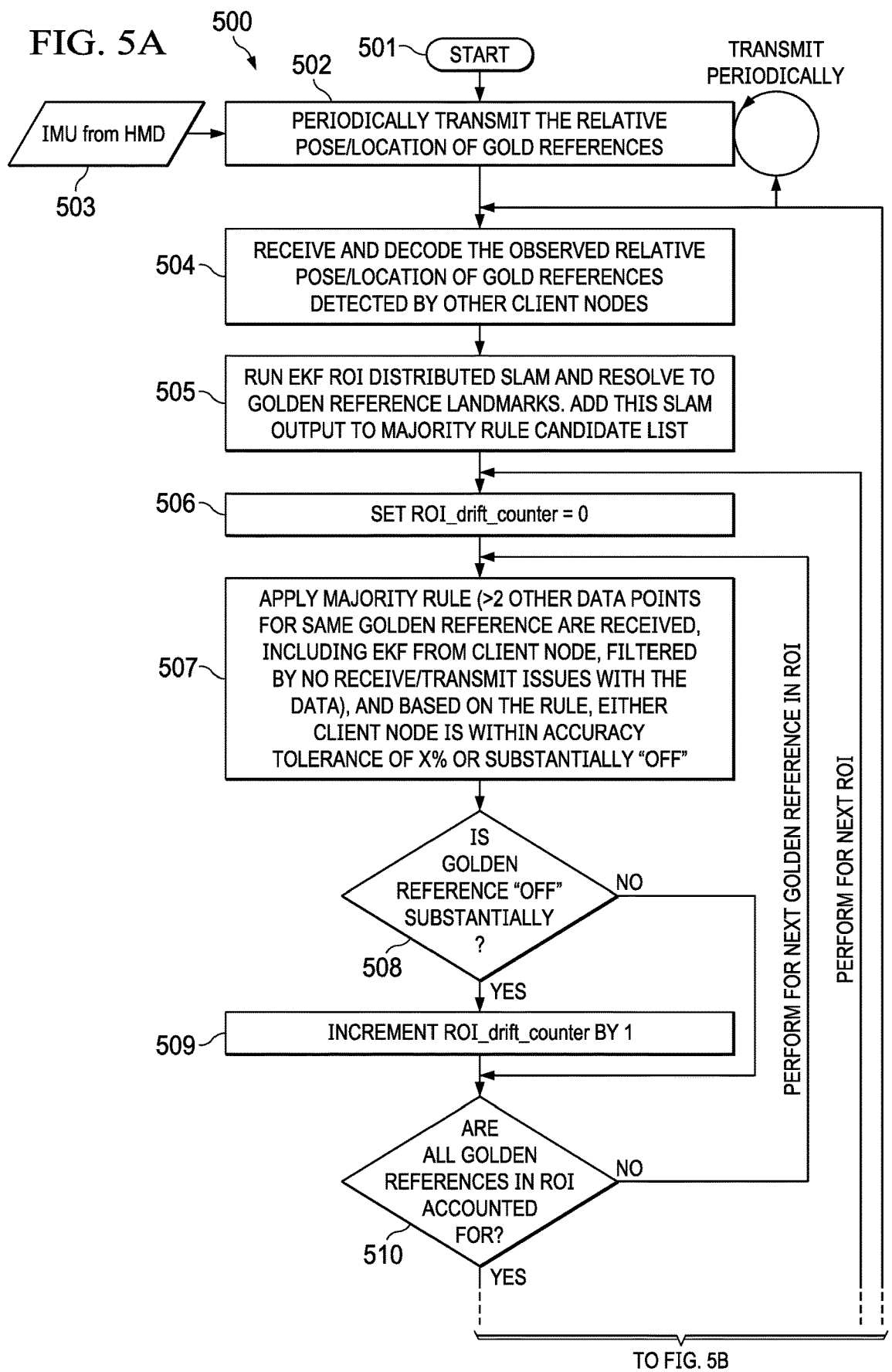

US 10,937,192 B2

RESOLVING INCORRECT DISTRIBUTED SIMULTANEOUS LOCALIZATION AND MAPPING (SLAM) DATA IN EDGE CLOUD ARCHITECTURES

FIELD

The present disclosure generally relates to Information Handling Systems (IHSs), and, more particularly, to systems and methods for resolving incorrect distributed Simultaneous Localization and Mapping (SLAM) data in edge cloud architectures.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for resolving incorrect distributed Simultaneous Localization and Mapping (SLAM) data in edge cloud architectures are described. In an illustrative, non-limiting embodiment, an Information Handling System (IHS), may include: a processor; and a memory coupled to the processor, the memory having program instructions stored thereon that, upon execution, cause the IHS to: receive SLAM data obtained by a first Head-Mounted Device (HMD), where the SLAM data comprises a first plurality of landmarks usable to produce a first map of a physical space for the first HMD; select a first set of golden references among the first plurality of landmarks; receive, from a second IHS coupled to a second HMD, a second set of golden references selected among a second plurality of landmarks usable to produce a second map of the physical space for the second HMD; determine that a first instance of a given golden reference in the first set of golden references matches a second instance of the given golden reference in the second set of golden references; and in response to the first and second instances of the given golden reference being distant from each other by a threshold value, produce a new first map of the physical space for the first HMD.

For example, the SLAM data may include landmark data found in a Region of Interest (ROI) within an infrared (IR) or near-IR (NIR) frame captured via a camera mounted on the first HMD. To select the first set of golden references, the program instructions, upon execution, may cause the IHS to identify one or more IR markers captured in an ROI overlap between the first and second HMDs. Additionally, or alternatively, the IHS may perform an object recognition operation in an ROI overlap between the first and second HMDs.

In various implementations, the second IHS may be selected from the group consisting of: a co-located IHS, an edge server, and a cloud server. The program instructions, upon execution, may cause the IHS to select the second HMD over at least another co-located HMD based upon a latency parameter or a computation parameter associated with the second IHS. Moreover, to determine that the first and second instances of the given golden references match, the program instructions, upon execution, may cause the IHS to transform a position of the second instance of the given golden reference into a coordinate system of the first HMD using a pose of the second HMD.

In another illustrative, non-limiting embodiment, a hardware memory may have program instructions stored thereon that, upon execution by an IHS, cause the IHS to: receive SLAM data obtained by a first HMD, where the SLAM data comprises a first plurality of landmarks usable to produce a first map of a physical space for the first HMD; select a first set of golden references among the first plurality of landmarks; receive, from a second IHS coupled to a second HMD, a second set of golden references selected among a second plurality of landmarks usable to produce a second map of the physical space for the second HMD; determine that a first instance of a given golden reference in the first set of golden references matches a second instance of the given golden reference in the second set of golden references; in response to the first and second instances of the given golden reference being separated from each other by a threshold distance, increase a count of incorrect golden references; and in response to the count of incorrect golden references being greater than a threshold value, produce a new first map of the physical space for the first HMD.

In some cases, the second IHS may be: a co-located server in response to the first HMD having a first latency requirement, an edge server in response to the first HMD having a second latency requirement smaller than the first latency requirement, or a cloud server in response to the first HMD having a third latency requirement smaller than the second latency requirement. Additionally, or alternatively, the second IHS may be: a co-located server in response to the first HMD having a first compute requirement, an edge server in response to the first HMD having a second compute requirement greater than the first compute requirement, or a cloud server in response to the first HMD having a third compute requirement greater than the second compute requirement.

Additionally, or alternatively, the second IHS may be: a co-located server in response to the first HMD moving with a first speed, an edge server in response to the first HMD moving with a second speed smaller than the first speed, or a cloud server in response to the first HMD moving with a third speed smaller than the second speed. Additionally, or alternatively, the second IHS may be: a co-located server in response to the first instance of the given golden reference having moved with a first speed in previous SLAM data, an edge server in response to the first instance of the given golden reference having moved with a second speed smaller than the first speed in previous SLAM data, or a cloud server in response to the first instance of the given golden reference having moved with a third speed smaller than the second speed in the previous SLAM data.

The program instructions, upon execution, may cause the IHS to: receive, from a third IHS coupled to a third HMD, a third set of golden references selected among a third plurality of landmarks usable to produce a third map of the physical space for the third HMD; identify a third instance of the given golden reference in the third set of golden references; and increase the count of incorrect golden references, in part, in response to the first and third instances of the given golden reference being separated from each other by the threshold distance.

The program instructions, upon execution, may further cause the IHS to determine, based upon the second and third sets of golden references, a current position of the first HMD. Moreover, the program instructions, upon execution, may cause the IHS to: determine, a difference between: (i) the current position of the first HMD; and (ii) a position of the first HMD as detected by the first HMD; and compensate the location of newly selected golden landmarks used to produce the new first map of the physical space based on the difference.

In yet another illustrative, non-limiting embodiment, a method may include receiving SLAM data obtained by a first HMD, where the SLAM data comprises a first plurality of landmarks usable to produce a first map of a physical space for the first HMD; selecting a first set of golden references among the first plurality of landmarks; receiving, from a second IHS coupled to a second HMD, a second set of golden references selected among a second plurality of landmarks usable to produce a second map of the physical space for the second HMD; determining that a first instance of a given golden reference in the first set of golden references matches a second instance of the given golden reference in the second set of golden references; in response to the first and second instances of the given golden reference being separated from each other by a threshold distance, increasing a count of incorrect golden references; in response to the count of incorrect golden references being greater than a threshold value, producing a new first map of the physical space for the first HMD; identifying a difference between: (i) a current position of the first HMD, determined based upon the second and third sets of golden references, and (ii) a position of the first HMD as detected by the first HMD; and compensating the location of newly selected golden landmarks based on the difference.

In some cases, the second IHS may be: a co-located server in response to the first HMD having a first latency requirement, an edge server in response to the first HMD having a second latency requirement, or a cloud server in response to the first HMD having a third latency requirement. Additionally, or alternatively, the second IHS may be: a co-located server in response to the first HMD having a first compute requirement, an edge server in response to the first HMD having a second compute requirement, or a cloud server in response to the first HMD having a third compute requirement.

Additionally, or alternatively, the second IHS may be: a co-located server in response to the first HMD moving with a first speed, an edge server in response to the first HMD moving with a second speed, or a cloud server in response to the first HMD moving with a third speed. Additionally, or alternatively, the second IHS may be: a co-located server in response to the first instance of the given golden reference having moved with a first speed in previous SLAM data, an edge server in response to the first instance of the given golden reference having moved with a second speed in previous SLAM data, or a cloud server in response to the first instance of the given golden reference having moved with a third speed in previous SLAM data.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIGS. 5A and 5B illustrate an example of a method for resolving incorrect distributed Simultaneous Localization and Mapping (SLAM) data in edge cloud architectures, according to some embodiments.

DETAILED DESCRIPTION

Embodiments described herein provide systems and methods for resolving incorrect distributed Simultaneous Localization and Mapping (SLAM) data in edge cloud architectures. These techniques are particularly useful in virtual, augmented, and mixed reality (xR) applications that employ Head-Mounted Devices (HMDs), Heads-Up Displays (HUDs), and eyeglasses—collectively referred to as "HMDs."

In distributed SLAM, multiple co-located client nodes perform SLAM collaboratively to create a map (a "SLAM map") of their shared physical space. In many real-life implementations, however, distributed SLAM cannot always maintain full synchronization among client nodes, which often produces some amount of drift in the accuracy (e.g., position, size, staleness, etc.) of the SLAM maps constructed using such methods. To address these, and other concerns, systems and methods described herein may periodically detect and resolve incorrect landmarks found in a shared or distributed SLAM map.

In some embodiments, during a calibration operation, a client node (e.g., an HMD coupled to a supporting IHS) may identify and select landmarks as "golden references." Multiple HMDs may be co-located in a given space, and their supporting IHSs may be either co-located or part of an edge cloud architecture.

In steady state, a client node (e.g., HMD 102 and IHS 103) may periodically transmit its relative pose, as well as the coordinates of its golden references, as a beacon, to other nodes. The client node may apply one or more rules, for each ROI of its SLAM map, to verify whether its golden references(s) for that ROI are within selected tolerance values. If not, the client node may replace the corrupted golden references with another node's golden references(s). Additionally, or alternatively, the client node may refresh its SLAM map with an asynchronous request to other relevant client nodes for their partial SLAM maps.

Additionally, or alternatively, systems and methods described herein may use self-correction mechanisms from distributed compute architectures to resolve critical SLAM landmarks data periodically as a way to compensate for built in probabilistic estimation inaccuracies in Extended Kalman Filtering (EKF) SLAM.

Figure 1A:
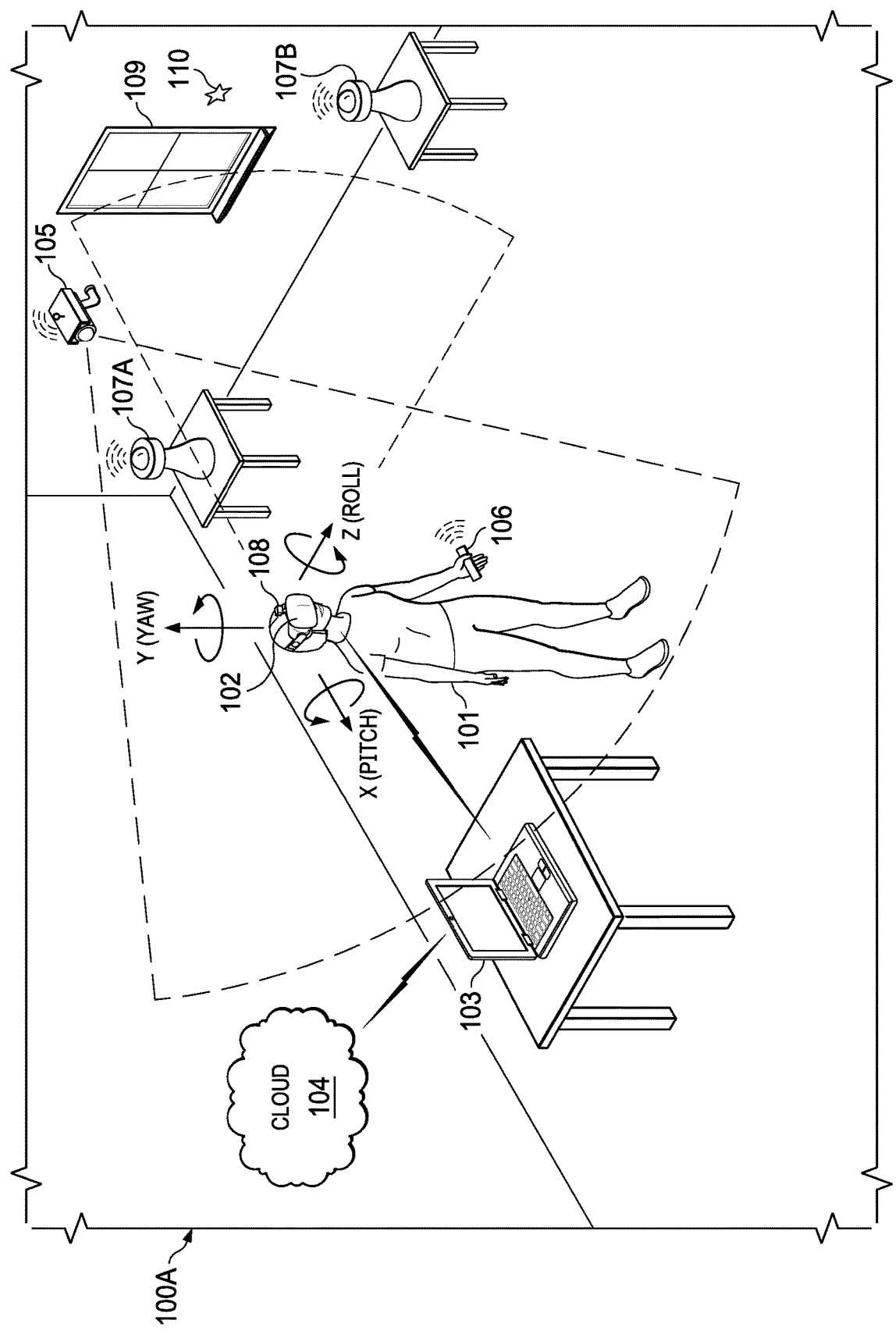
FIGS. 1A-D illustrate an example of an environment where a virtual, augmented, or mixed reality (xR) application may be executed, according to some embodiments.

FIG. 1A is a perspective view of environment 100A where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In various applications, two or more users may be in the same environment or room 100A such that their respective HMDs may be said to be co-located. For example, co-located HMDs may be within a predefined physical distance from each other (e.g., up to 10 meters), and each HMD worn by each user may be coupled to a distinct IHS. As noted above, in some cases, the IHS serving a particular HMD may be part of an edge cloud architecture.

In environment 100A, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective.

As user 101 moves about environment 100A, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment among a plurality of users. For example, each user may wear their own HMD tethered to a different host IHS, such as in the form of a video game or a productivity application (e.g., a virtual meeting).

Figure 1B:
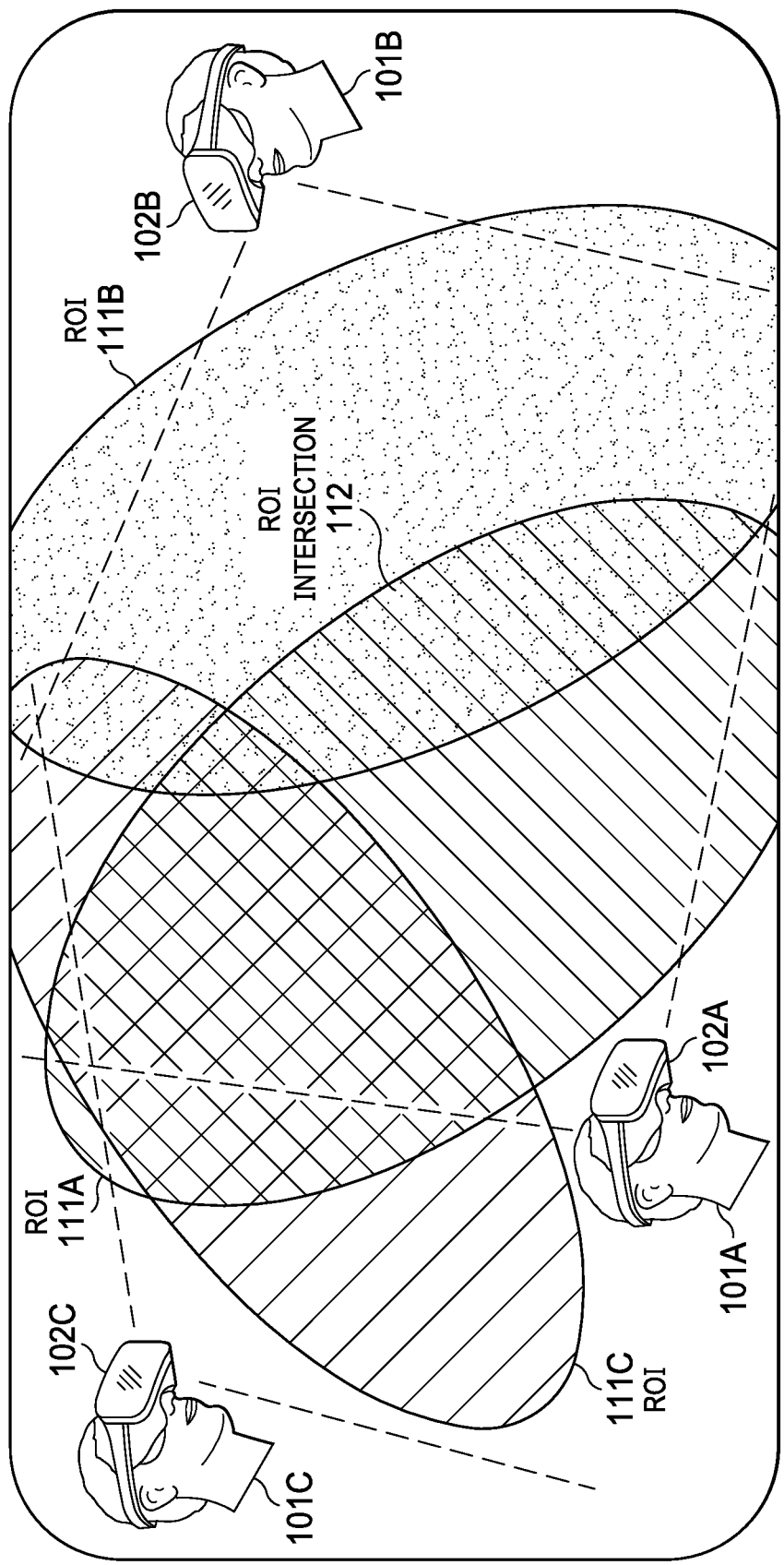

FIG. 1B shows a co-located multi-user xR implementation with three participants 101A-C, each participant wearing their own HMD 102A-C. In some cases, each of HMDs 102A-C may be tethered to its own dedicated IHS 103A-C. Alternatively, a first number M of HMDs and a second number N of IHSs may be used (e.g., one IHS "server" for two HMD "clients," etc.). In this example, it is assumed that each of the IHSs may have different compute capabilities; and that all HMDs are using inside-out Extended Kalman Filtering (EKF) SLAM tracking, with wide mapping field of view up to 360 degrees (e.g., with surround sensors and/or cameras).

As such, each HMD 102A-C may include an instance of inside-out camera 108 configured to capture IR/NIR frames, and therefore sends those frames and associated data (SLAM data) to its respective IHS 103A-C. Then, each IHS 103A-C determines one or more Regions-of-Interest (ROIs) 111A-C within the HMD 102A-C's respectively captured frames and/or field-of-view (FOV), and performs one or more SLAM operations upon the SLAM data obtained for each ROI. In some cases, an ROI may be equal to an FOV plus a delta 3D range for anticipatory movements.

Depending upon the position and pose of each HMD, ROI intersection area 112 may occur, for example, such that redundant or duplicate calculations are performed by HMDs 102A-C for landmarks found in that intersection.

Figure 1C:
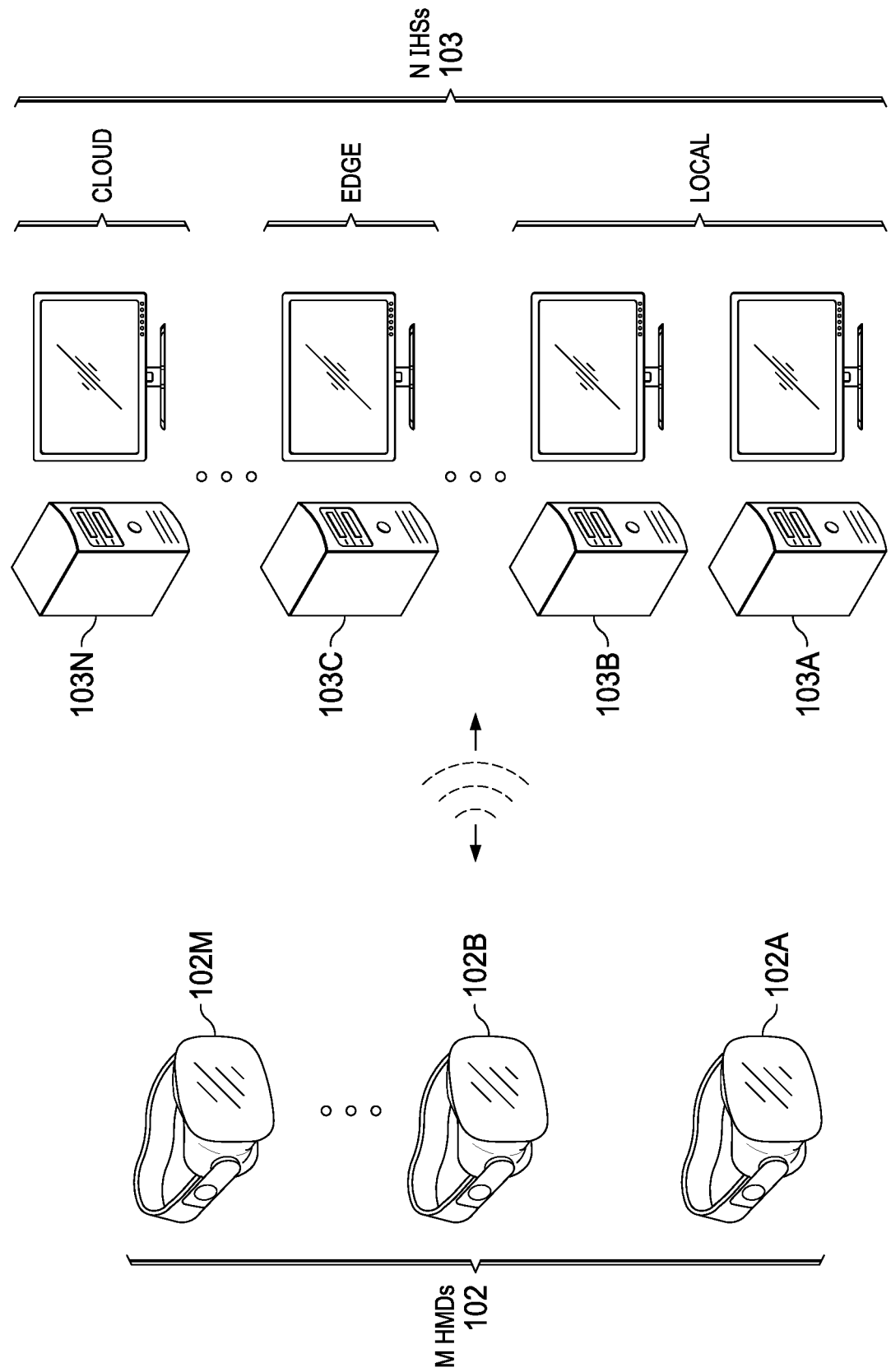

FIG. 1C shows HMD client nodes 102A-M connected wired/wirelessly in a mesh ad-hoc network architecture to IHS server nodes 103A-N. In some architectures, one of IHS nodes 103A-N (e.g., the first node to start the xR collaboration session) may be responsible for session control actions, but otherwise the network may remain without a central server. Additionally, or alternatively, remote edge server 103C and/or remote cloud server 103N may enable co-located IHSs 103A and 103B (with respect to HMDs 102A-M) to offload xR processing and/or additional operations to it, as part of an edge cloud architecture, or the like.

Figure 1D:
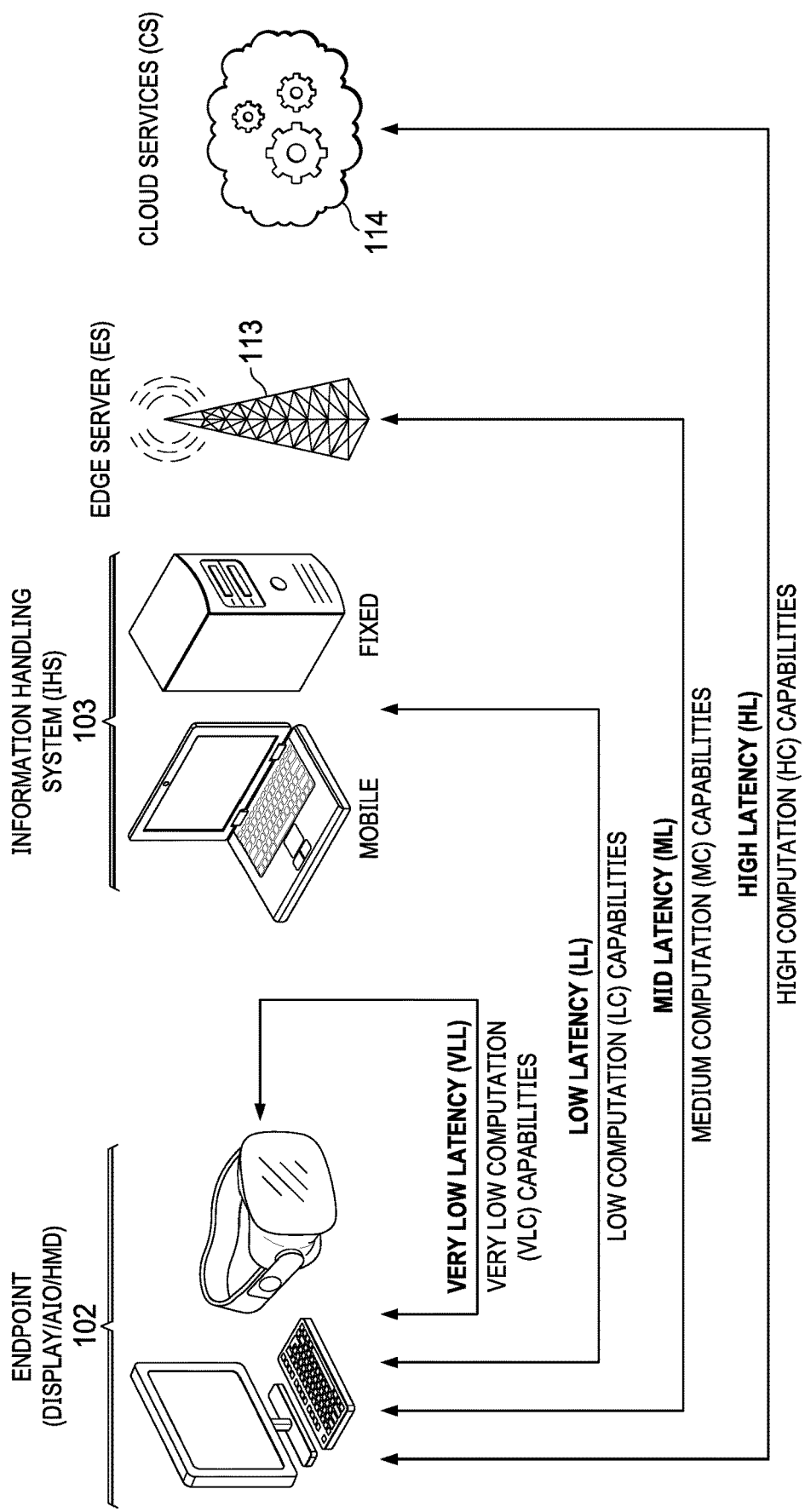

FIG. 1D shows an example of an edge cloud compute architecture usable by any of HMD client nodes 102A-M to access a respective one of IHS nodes 103A-N, according to some embodiments. In this example, edge server 113 may be in close proximity to the last mile of a wireless network serving HMD 102 and/or IHS 103; that is, at the edge of that network. In contrast, cloud server 114 may include any virtualized or physical IHS that provides computation and data storage services remotely through the Internet, or the like. Different levels of round-trip latency are involved in communications between a given HMD and respective ones of co-located IHS 103, edge server 113, and cloud server 114, increasing from left to right.

In some cases, HMD 102 may be an all-in-one (AIO) device with enough compute power to operate untethered from any IHS, such that all processing is entirely performed by HMD 102, which results in Very Low Latency (VLL) processing. Additionally, or alternatively, HMD 102 may be tethered to a co-located IHS 103, mobile (e.g., backpack or vest) or fixed (e.g., on a desk), such that the external IHS 103's compute resources are used, resulting in Low Latency (LL) processing/communications.

Additionally, or alternatively, HMD 102 may be configured to use compute resources available at edge server 113 (directly or via indirectly via IHS 103), resulting in Mid Latency (ML) processing/communications. Additionally, or alternatively, HMD 102 may be configured to use compute resources available at cloud server 114 (directly or via indirectly via IHSs 103 and/or 113), resulting in High Latency (HL) processing/communications.

In some implementations, VLL may have a round-trip latency smaller than 20 ms, LL may have a round-trip latency between 20 ms and 50 ms, ML may have a round-trip latency between 50 ms and 200 ms, and HL may have a round-trip latency greater than 200 ms.

The example edge cloud architecture of FIG. 1D also has different levels of computation resources available, increasing in capabilities from left (102) to right (114). Particularly, HMD 102 is deemed to have Very Low Computation (VLC) capability, co-located IHS 103 has Low Computation (LC) capabilities, edge server 113 has Medium Computation (MC) capabilities, and cloud server 114 has High Computation (HC) capabilities.

For example, HC may include a deep learning and object recognition pipeline, MC may include dense SLAM compute and/or VR ready-line graphics (e.g., in Kflops/pixel), and LC may include Dynamic Time Warping (DTW), whereas VLC may implement constrained channel bitrate adaptation mechanisms. In some cases, each of computation capacities VLC-HC may be quantified on a scale (e.g., numerically) with respect to an amount of processing power, access to data, and/or ability to perform complex algorithms such as machine learning, object recognition, tagging, etc.

In some implementations, each IHS node in an edge cloud compute architecture may be further characterized by its ability to process video frames captured by HMD 102, for example, to perform SLAM computations. For instance, IHS 103 may be capable of performing SLAM computations at 30 frames-per-second (FPS), edge server 113 may perform SLAM computations at 10 FPS, and cloud server 114 may perform SLAM computations at 1 FPS.

In the case of co-located users in an edge cloud architecture, it becomes important to optimize the performance of SLAM operations (e.g., compute, accuracy) executed by the various HMDs and their respective IHSs. Additionally, it is important to have a scalability mechanism for the edge cloud architecture to operate in cohesion, optimize compute, and speed up mapping (e.g., localization and tracking map updates); while improving accuracy and maintaining low latency of updates.

Figure 2:
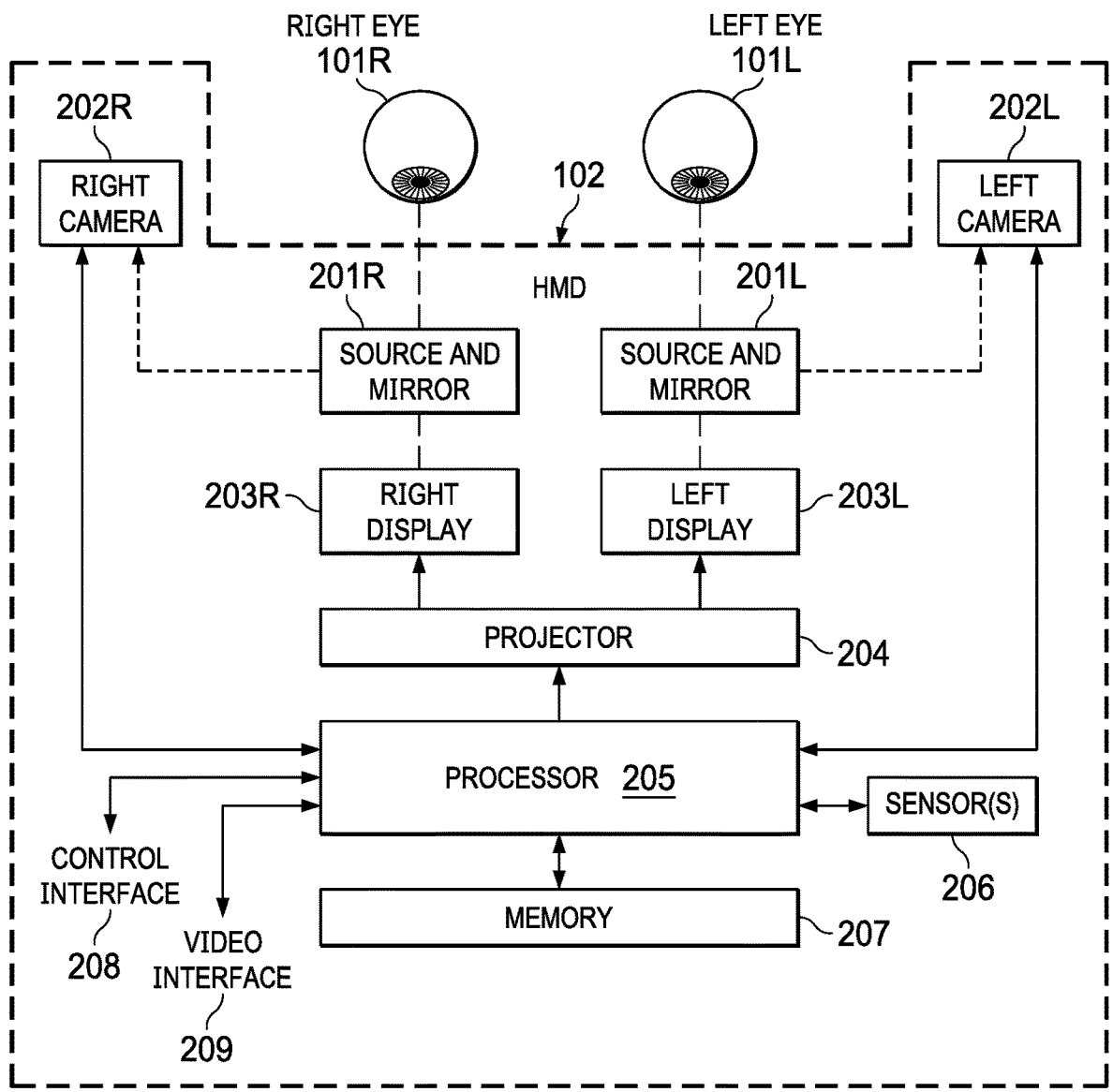
FIG. 2 illustrates an example of electronic components of a Head-Mounted Display (HMD), according to some embodiments.

FIG. 2 illustrates an example of electronic components of HMD 102. In some embodiments, HMD 102 comprises a projection system that includes projector 204 configured to display image frames, including stereoscopic right and left images, on right and left displays 203R and 203L that are viewed by a user right and left eyes 101R and 101L, respectively. Such a projection system may include, for example, a Digital Light Processing (DLP), a Liquid Crystal Display (LCD), or the like. To create a three-dimensional (3D) effect in a 3D virtual view, virtual objects (VOs) may be rendered at different depths or distances in the two images. HMD 102 includes processor 205 configured to generate frames that are displayed by projector 204. Hardware memory 207 is configured to store program instructions executable by processor 205, as well as other data. In other embodiments, however one or more operations described for processor 205 may be implemented by a different processor within IHS 103.

Accordingly, in some embodiments, HMD 102 may also include control interface 208 and video interface 209 (e.g., a Bluetooth technology interface, USB interface, etc.) configured to communicate with IHS 103. Control interface 208 may provide forward and backward communication channels between HMD 102 and IHS 103, depending upon the architecture of the xR system, to facilitate execution of an xR application. For example, program instructions stored in memory 207, when executed by processor 205, may cause frames captured by camera(s) 108 to be transmitted to IHS 103 via control interface 208.

IHS 103 may in turn execute SLAM module 403 (FIG. 4), for example, based upon landmarks found in the video frames received from camera 108. Particularly, SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from SLAM module 403 to render an image to be provided to projector 204 via video interface 209 (e.g., High-Definition Multimedia Interface or "HDMI," Digital Visual Interface or "DVI," DISPLAYPORT, etc.). In some cases, video interface 209 may include two separate video interfaces, one for each display 203R/L. Additionally, or alternatively, a single interface that supports multi-stream may be used to drive both displays 203R/L.

In some embodiments, HMD 102 may include one or more sensors 206 that collect information about the user's environment (e.g., video, depth, lighting, motion, etc.) and provide that information to processor 205. Sensors 206 may include, but are not limited to, inside-out cameras, outside-in cameras, eye tracking cameras, RGB cameras, gesture cameras, infrared (IR) or near-IR (NIR) cameras, SLAM cameras, etc. Additionally, or alternatively, sensors 206 may include electric, magnetic, radio, optical, infrared, thermal, force, pressure, acoustic, ultrasonic, proximity, position, deformation, movement, velocity, rotation, gyroscopic, and/or acceleration sensor(s). In some cases, sensors 206 may be coupled to processor 205 via a sensor hub.

HMD 102 may be configured to render and display frames to provide an xR view for user 101 according to inputs from sensors 206. For example, an xR view may include renderings of the user's real-world environment based on video captured by camera 108. The xR view may also include virtual objects composited with the projected view of the user's real environment.

Still referring to FIG. 2, right and left Near Infra-Red (NIR) light sources 201R and 201L (e.g., NIR LEDs) may be positioned in HMD 102 to illuminate the user's eyes 101R and 101L, respectively. Mirrors 201R and 201L (e.g., "hot mirrors") may be positioned to direct NIR light reflected from eyes 101R and 101L into EGT cameras 202R and 202L located on each side of the user's face. In other implementations, instead of EGT cameras 202R and 202L, a single EGT camera, or a combination of a wide-angle camera with and a narrower-angle camera, may be used.

EGT information captured by cameras 202R and 202L may be provided to processor 205 to be further processed and/or analyzed. For example, processor 205 may adjust the rendering of images to be projected, and/or it may adjust the projection of the images by the projector 204 based on the direction and angle at which eyes 101R/L are looking. Additionally, or alternatively, processor 205 may estimate the point of gaze on right and left displays 203R and 203L to enable gaze-based interaction with xR content shown on those displays.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
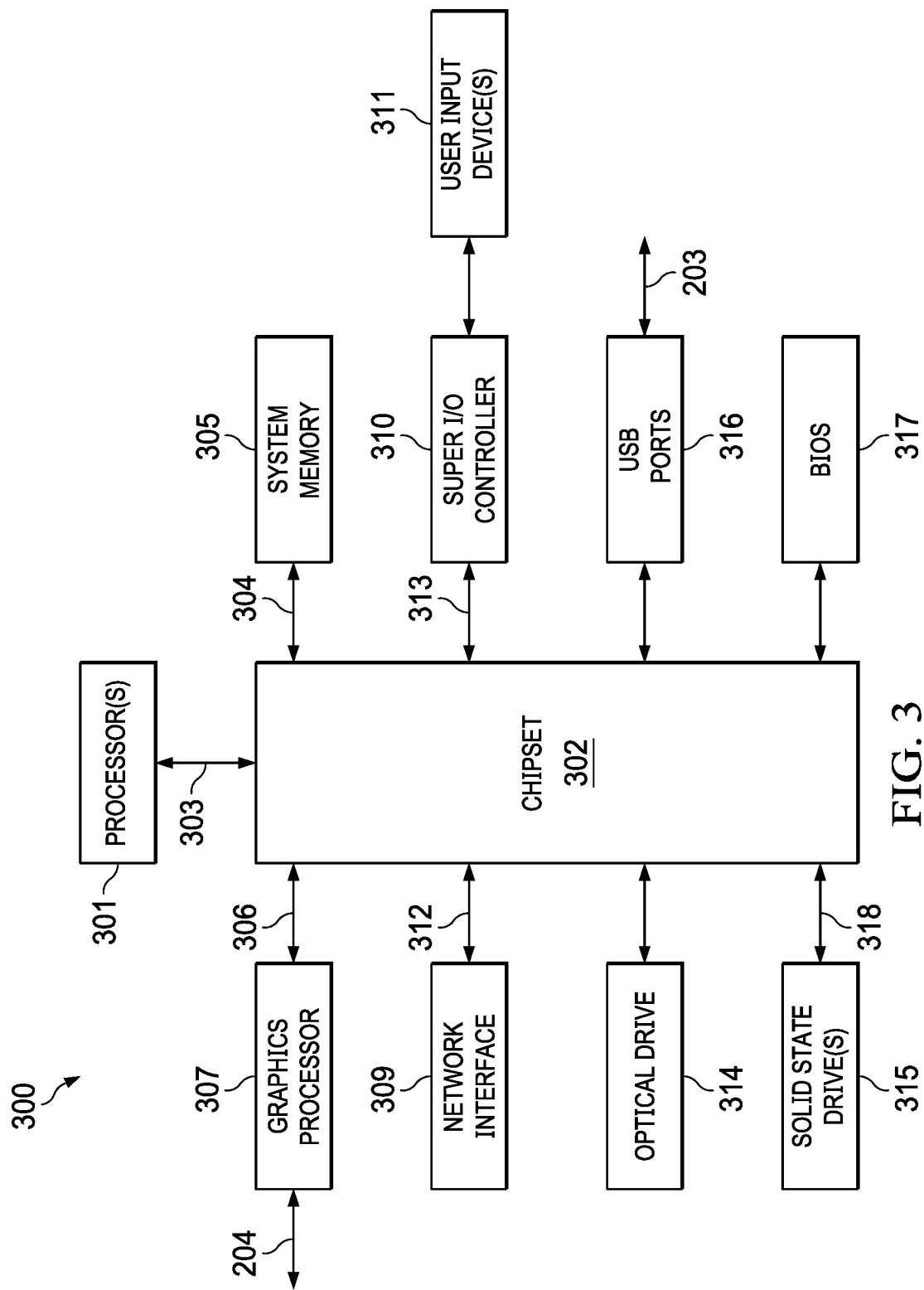
FIG. 3 illustrates an example of electronic components of an Information Handling System (IHS), according to some embodiments.

FIG. 3 is a block diagram of IHS 300 configured to implement host IHS 103, according to certain embodiments. As shown, IHS 300 may include one or more processors 301. In various implementations, IHS 300 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 300 includes chipset 302 that may include one or more integrated circuits that are connect to processor(s) 301. In certain embodiments, chipset 302 may utilize QuickPath Interconnect (QPI) bus 303 for communicating with the processor(s) 301. Chipset 302 provides the processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of IHS 300. Graphics processor 307 may be coupled to the chipset 302 via a graphics bus 306 such as provided by an Accelerated Graphics Port (AGP) bus or a Peripheral Component Interconnect Express (PCIe) bus. In certain embodiments, graphics processor 307 generates display signals and provides them to HMD device 102 via video interface 204.

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to the super I/O controller 310 via a Low Pin-Count (LPC) bus 313.

Other resources may also be coupled to the processor(s) 301 of IHS 300 through the chipset 302. In certain embodiments, chipset 302 may be coupled to a network interface 309, such as provided by a Network Interface Controller (NIC) that is coupled to IHS 300. In certain embodiments, the network interface 309 may be coupled to the chipset 302 via a PCIe bus 312. According to various embodiments, network interface 309 may support communication via various wired and/or wireless networks. In certain embodiments, the chipset 302 may also provide access to one or more Universal Serial Bus (USB) ports 316; which in some implementations may serve as transport for establishing control interface 203 with HMD 102.

Chipset 302 also provides access to one or more solid-state storage devices 315. The chipset 302 utilizes a PCIe bus interface connection 318 in order to communicate with the solid-state storage device 315. In certain embodiments, chipset 302 may also provide access to other types of storage devices. For instance, in addition to the solid-state storage device 315, an IHS 300 may also utilize one or more magnetic disk storage devices, or other types of the storage devices such as an optical drive or a removable-media drive. In various embodiments, the solid-state storage device 315 may be integral to IHS 300, or may be located remotely from IHS 300.

Another resource that may be accessed by processor(s) 301 via chipset 302 is a Basic Input/Output System (BIOS) 317. As described in more detail below with respect to additional embodiments, upon powering or restarting IHS 300, processor(s) 301 may utilize BIOS 317 instructions to initialize and test hardware components coupled to IHS 300 and to load an operating system for use by IHS 300. BIOS 317 provides an abstraction layer that allows the operating system to interface with certain hardware components that are utilized by IHS 300. Via this hardware abstraction layer provided by BIOS 317, the software executed by the processor(s) 301 of IHS 300 is able to interface with certain I/O devices that are coupled to IHS 300. As used herein, the term "BIOS" is intended to also encompass Unified Extensible Firmware Interface (UEFI).

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 4:
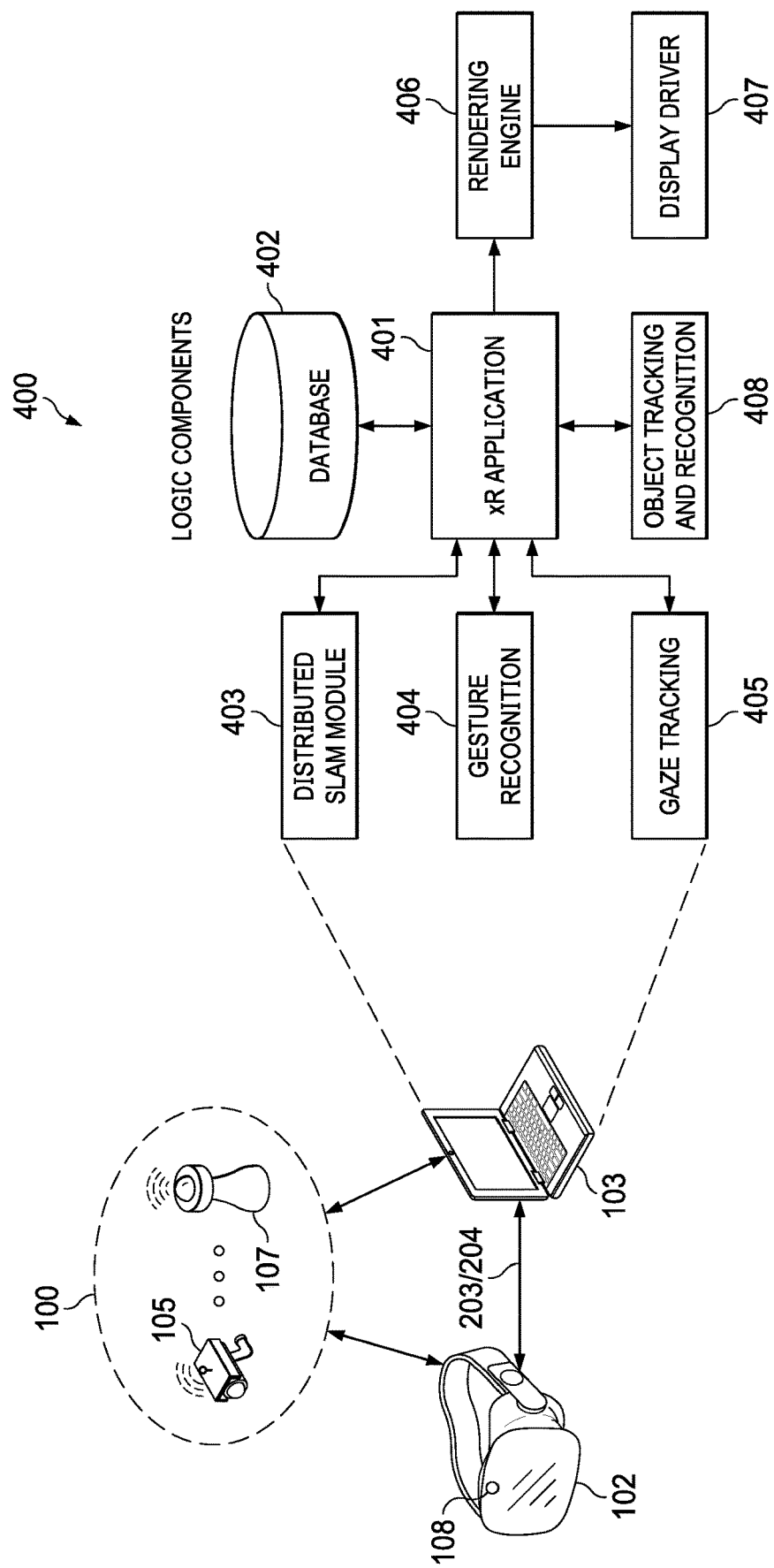
FIG. 4 illustrates an example of logic components of an xR application, according to some embodiments.

FIG. 4 illustrates logic components 400 of xR application 401. Generally, xR application 401 may include any xR application now existing or yet to be developed, including, but not limited to: entertainment, video games, robotics, healthcare, education and training, military uses, occupational safety, engineering, industrial or product design, collaboration applications, virtual meetings, etc.

Distributed SLAM module 403 uses positional tracking devices among camera(s) and sensor(s) 202 (e.g., in the IR spectrum) to construct a map of an unknown environment where an HMD is located, which simultaneously identifies where the HMD is located, its orientation, and/or pose.

Generally, distributed SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors among sensor(s) 202. And, in many embodiments, each different SLAM method may use a different positional tracking source or device. For example, wireless tracking may use a set of anchors or lighthouses 107A-B that are placed around the perimeter of environment 100A and/or one or more totems 106 or tags 110 that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and received sound waves.

Optical tracking may include any suitable computer vision algorithm and tracking device, such as a camera of visible (RGB), IR, or NIR range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100A.

An estimator, such as an Extended Kalman filter (EKF), may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100A may be obtained, at least in part, from cloud 104.

For example, HMD 102 may capture IR/NIR frames (e.g., from camera 108), perform image pre-processing operations, generate object detection of landmarks using feature extraction techniques, and send SLAM data (e.g., pixel values for each pixel in the ROI, along with IR/NIR frame data, coordinates of detected landmarks, etc.) to host IHS 103. Host IHS 103 may perform EKF operations for each detected landmark and it may calculate a Kalman Gain (G) for each landmark (L), which in turn indicates a confidence or probability of the landmark's measured location being accurate.

In some cases, the consumption of IHS 103's hardware resources (e.g., CPU, GPU, memory, etc.) during operation of a SLAM method may be dependent upon the order or dimension of a square covariance matrix of landmark data (or other features extracted from sensor data). Particularly, IHS hardware resource utilization may be dominated by $O(M^2)$, where M is the number of landmarks detected: if M* is smaller than M, then host hardware utilization is reduced by $(M^2-M^{*2})/M^2 \times 100\%$. For example, if there are 100 landmarks detected (M=100), but only 50 landmarks are used (M=50), the reduction in utilization may be of 75%.

In various embodiments, distributed SLAM module 403 may be configured to sort or rank detected landmarks by confidence, probability, or priority; generate a cutoff based upon a desired or expected amount of resource utilization reduction (e.g., compute load) using calibration data; and employ only a selected subset of all available landmarks (e.g., the M* highest-ranked of M landmarks to be used; M*<M) to generate covariance matrices to be used by the SLAM method thereafter.

In some embodiments, calibration of number of landmarks versus average CPU load (or any other IHS hardware resource) may be performed for the space where the user is engaging in an xR experience, and a calibration curve may be stored in database 402. The calibration curve provides a baseline for the space and the HMD-Host combination; but it should be noted that the process is specific to an HMD, the host IHS being used, and their environment. Calibration may also be used to select an optimal number M of sorted landmarks to use in steady state as the maximum number of landmarks to compute (e.g., a user may set the maximum permitted CPU load for SLAM at 10%, which limits the number of landmarks to 50).

Distributed SLAM module 403 may receive and rank all landmarks detected by HMD 102A (and other HMDs 102B-C and/or their respective IHSs), for example, using EKF. Particularly, EKF may be used to estimate the current state of a system based on a previous state, current observations, and estimated noise or error. A state is defined as a 1×N vector, where N is the number of measurements in a state. The primary relationship for an EKF defines a state transition as:

(New State)=(Old State)+$G$((Current Observation)−(Old State))

where G is known as the Kalman Gain. The value of G is based on average noise and/or measurement error over time, and it determines how much the current observation can be trusted.

The system state in an EKF for SLAM may be a 1×(6+3N) vector, where N is the number of landmarks. In that case, there may be 3 coordinates (e.g., x, y, z) for each landmark, and 6 coordinates (e.g., x, y, z, pitch, roll, yaw) for the user. Landmarks may be any static points in space that can be re-observed at a later state to determine how the system changed (a good landmark is easily identifiable and does not move, such as a wall, window, power outlet, etc.).

In various implementations, a matrix or table of size $(6+3N)^2$ stores the covariance between every pair of state measurements, and may be used when determining the Kalman Gain for a given landmark. The Kalman Gain may be used to determine how much to change every other state measurement based on the re-observed location of a single landmark: a greater Kalman Gain means that the landmark's new position may be trusted and used to update the system's state. Conversely, a Kalman Gain of zero means the position cannot be at all trusted and therefore the landmark should be ignored.

The use of EKF by distributed SLAM module 403 may be divided into 3 parts. The first part updates the current state from user movement. Motion may be described by the IMU data on the HMD, and the user's position and every known landmark's position may be estimated and updated. The second part uses re-observed landmarks via laser scanner or object recognition to update current state (both user position and landmark positions) more accurately than using IMU data, calculates G for the re-observed landmark, and updates the system accordingly. As noted above, G may be a vector showing how much to update every state variable based on the landmark's new position. The third part adds newly-observed landmarks to the system's state. Adding new landmarks adds to the dimensionality of the system state and covariance matrix, such that the algorithm runs on the order of $O(N^2)$, where N is the number of used landmarks.

To rank the landmarks, distributed SLAM module 403 may create a list of landmarks indices, sort the landmark indices by the Kalman Gain of corresponding landmarks, and produce a ranked or sorted list of all detected landmarks. Distributed SLAM module 403 may select a subset of landmarks, and IHS 103 produces an xR environment displayed by HMD 102 based on SLAM processing using only the selected subset of landmarks.

Gesture recognition module 404 may also use one or more cameras or optical sensors 202 that enable user 101 to use their actual hands for interaction with virtual objects (VOs) rendered by display 205 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-interest of configurable size or shape (e.g., circular, rectangular, etc.), based in part upon the gaze vector.

In various implementations, gaze tracking module 405 may use, among camera(s) and/or sensor(s) 202, NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection-based calculations that use NIR illumination to estimate the gaze direction or the point of gaze using polynomial functions, or a geometrical model of the human eye.

Gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, gaze tracking module 405 may be configured to follow the user's gaze direction for natural exploration of a visual scene by capturing the user's visual perspective. In some cases, pupil motion may be tracked to estimate a user's viewing point, with Kalman filtering to minimize pupil jitter and drifts. Moreover, gaze tracking module 405 may be used to calculate or adjust the user's field-of-view (FOV).

Rendering engine 406 may include any engine (e.g., UNITY, UNREAL, AUTODESK, etc.) configured to render an xR model displayed by HMD 102 from user 101's unique point-of-view based upon the user's coordinate location (e.g., from distributed SLAM module 403), the user's pose (e.g., IMU), and/or the user's gaze (e.g., from gaze tracking module 405). Display driver 407 is coupled to rendering engine 406 and configured to convert rendered video frames to a display format that HMD 102 can reproduce before the user's' eyes.

Object tracking and recognition module 408 may implement any object identification or detection technique based on visual images, including, but not limited to: edge detection, corner detection, blob detection, ridge detection, or the like. In some cases, object tracking and recognition module 408 may operate with distributed SLAM module 403 to track the position or movement of objects using landmarks or the like.

Database 402 may include if/then rules with real-world objects and their location, orientation, and/or movement (e.g., angle(s), direction(s), trajector(ies), speed(s), etc.). In some cases, an if/then rule catalog may be filtered based upon the presence or identification of a master object and/or other surrounding, secondary objects in the user's FOV. Database 402 may include different if/then rule catalogs based upon the identity of an authenticated user, for example, as part of a profile. Additionally, or alternatively, if/then rules may be based upon historic continuous usage.

In various embodiments, communication methods described herein may take the form of server-client streaming with different transport layer mechanisms, such as Real-time Transport Protocol (RTP) over User Datagram Protocol (UDP)/Transmission Control Protocol (TCP), or the like. In some implementations, a service may be provided on IHS 103A to: run SLAM on configured ROIs for two or more HMDs 102A-C; receive ROI frames; and calculate landmark information. The service may also: receive absolute pose information related to the other HMDs, from their respective other IHSs; resolve absolute pose coordinates using camera transform matrix on landmarks received; construct a list of landmarks "observed" by all HMDs; and feed the list into the SLAM Application Programming Interface (API) of rendering engine 406.

As such, distributed SLAM module 403 of IHS 103A may not only receive and process SLAM data from that IHS's own HMD 102A, but it may also receive SLAM data from other HMDs 102B/C and/or their respective IHSs, of which one or more may be part of an edge cloud architecture. Rendering engine 406 of IHS 103A may render an updated world space camera view for HMD 102A that is built using ROIs/landmarks found by two or more HMD's IR/NIR camera(s) and/or sensors.

In some embodiments, a method may enable any given one of IHSs 103A-C to construct a map for entire space 100A using its own partial map obtained through HMD 102A, and also from HMD 102B and/or 102C and/or their respective IHSs. During an initial setup procedure, ROIs and capabilities may be established through mesh negotiation. In some cases, the size and position of each HMD's ROI—as a selected subset of pixels in a given frame—may be computed using conventional image processing methods. Each particular HMD 102A-C covers a respective one or more ROIs 111A-C, regardless of FOV (even assuming 360-degree SLAM). Each IHS may receive ROI landmark information obtained through other HMDs from their respective IHSS through IHS-to-IHS communications.

The current IHS (e.g., IHS 103A) may, on a per-HMD basis, resolve overlapping landmarks across ROIs that have intersections 112, including occlusion, etc. For example, if a first HMD detects a landmark that is naturally occluded by another object, from the perspective of a second HMD, the occluded landmark may nonetheless be used to render a map for the second HMD, once SLAM data related to the occluded landmark is obtained from the first HMD and transformed into the second HMD's coordinate system. The current IHS may, on a per-HMD basis, apply a corresponding transform matrix to transform landmarks from one ROI Point-of-View (POV) to the current HMD POV based on each HMD absolute and/or the current HMD's pose. Landmarks from HMDs 102B/C may be rotated, moved up/down, etc. when moved from one user's view to match the view of HMD 102A.

To resolve overlapping golden references, systems and methods described herein may also take into account the location of the hosts IHSS serving HMDs in an edge cloud architecture. For example, golden references may be received and/or selected by a given HMD/IHS pair depending upon whether another host IHS performing SLAM calculations for another HMD is characterized by VLL, LL, ML, or HL round-trip latencies. Additionally, or alternatively, golden references may be received and/or selected depending upon whether the other IHS performing SLAM calculations for the other HMD is characterized by VLC, LC, MC, or HC capabilities or SLAM processing features. Additionally, or alternatively, golden references may be received and/or selected depending upon a rate at which its IHS processes SLAM data.

Once overlapping golden references are resolved, they may be corrected for resolved pose, with observed EKFs and relative distances from each user. This data is available to the current IHS for every HMD with which the IHS is in direct communications. The current IHS communicates an HMD map to each HMD via an instance of render engine 406 for that HMD (e.g., IHS 103 may be running multiple render engines, or a single render engine with multi-views).

As used herein, the terms "transformation matrix" or "transform matrix" refer to matrices that determine how objects move around in space. For example, in some cases a transform matrix may be a 4×4 matrix that defines a transformation when applied to objects: translation, rotation and scaling. Translating an object moves it in space, rotating turns an object around its center, and scaling changes the size of an object. To apply a transform to a 3D object, such as a VO, every vertex in the 3D object may be multiplied by the transformation matrix.

When rendering engine 406 is operating, it needs to know where to place the "view camera" (i.e., the point of view for the render) in a given scene, which is done using a view matrix. For example, in some cases a view matrix may be a 4×4 matrix that contains information about the position and orientation of a viewing camera. Every vertex in the scene or frame may be multiplied the view matrix and the scene is rendered by HMD 102 (although the view matrix says how everything else in the scene should change to reflect the point of view of the camera, the camera itself does not move).

The inverse of the view matrix is referred to as the camera transform matrix, which describes how camera 108 itself moves around a scene or frame. That is, the camera transform matrix provides the position and rotation of camera 108.

To illustrate the distinction between a transform matrix and a view matrix, consider a scene that starts with camera 108 looking directly at a chair that is positioned in front of it. The user then turns the camera 45 degrees to the right (a). In this case the camera transform matrix would be a rotation matrix that indicates a 45-degree rotation to the right. The view matrix, however, would be a rotation matrix that indicates 45-degree rotation to the left around the camera's position. In another scene, if the user turns to the left and walks forward, the camera transform matrix would be a rotation matrix to the left followed by a translation matrix forward, which indicates how the user moved in the frame.

For example, if the user looks to the right (and HMD 102 turns right), the camera transform matrix obtained from SLAM sensor data may include a rotation to the right. If the user looks to the left (and HMD 102 turns left), the camera transform matrix obtained from SLAM sensor data may include a rotation to the left. If the user looks up (and HMD 102 turns upward), the camera transform matrix obtained from SLAM sensor data may include a rotation upward. And if the user looks down (and HMD 102 turns downward), the camera transform matrix obtained from SLAM sensor data may include a rotation downward. More generally, rotations around any axis may be performed by taking a rotation around the x axis, followed by a rotation around the y axis, and followed by a rotation around the z axis—such that any spatial rotation can be decomposed into a combination of principal rotations. Moreover, if HMD 102 moves forward, backward, or sideways, the camera transform matrix obtained from SLAM sensor data also reflects the resulting translation.

The term "world space," for xR application 401, refers to a coordinate system that defines where everything is located inside the application. Every object handled by xR application 401 may be given an X, Y and Z coordinate relative to an origin. Once calibrated, HMD sensors can transform their sensor data into world space coordinates. Then, when transform matrices are applied to 3D objects, the objects are moved around in world space. For instance, world space coordinates may be used by xR application 401 to overlay virtual hands directly on-top of the user's real hands.

During execution of xR application 401, HMD 102 transmits SLAM sensor data, eye-gaze tracking (EGT) sensor data, gesture recognition and tracking (GRT) data, and inter-process (IPC) communication data to IHS 103 via control interface 203. IHS 103 transmits encoded packetized rendered content (e.g., audio-video) to HMD 102 via video interface 204. As part of this process, distributed SLAM module 403 may perform one or more SLAM operations based on the SLAM data.

Distributed SLAM module 403 operates upon SLAM data to produce a map of the physical location where the HMD is, using a detected number of landmarks in a given ROI (e.g., the HMD's FOV+/−a delta). During a calibration operation, client nodes may agree on key landmarks' pose and their relative locations in each ROI of each HMD—selected landmarks may be referred to as golden references.

In some cases, golden references may be identified using IR markers disposed in the physical space. Additionally, or alternatively, golden references in an HMD's ROI may be identified via object recognition operations, for example, with markerless machine learning, using images obtained via a world-facing camera.

Figure 5B:
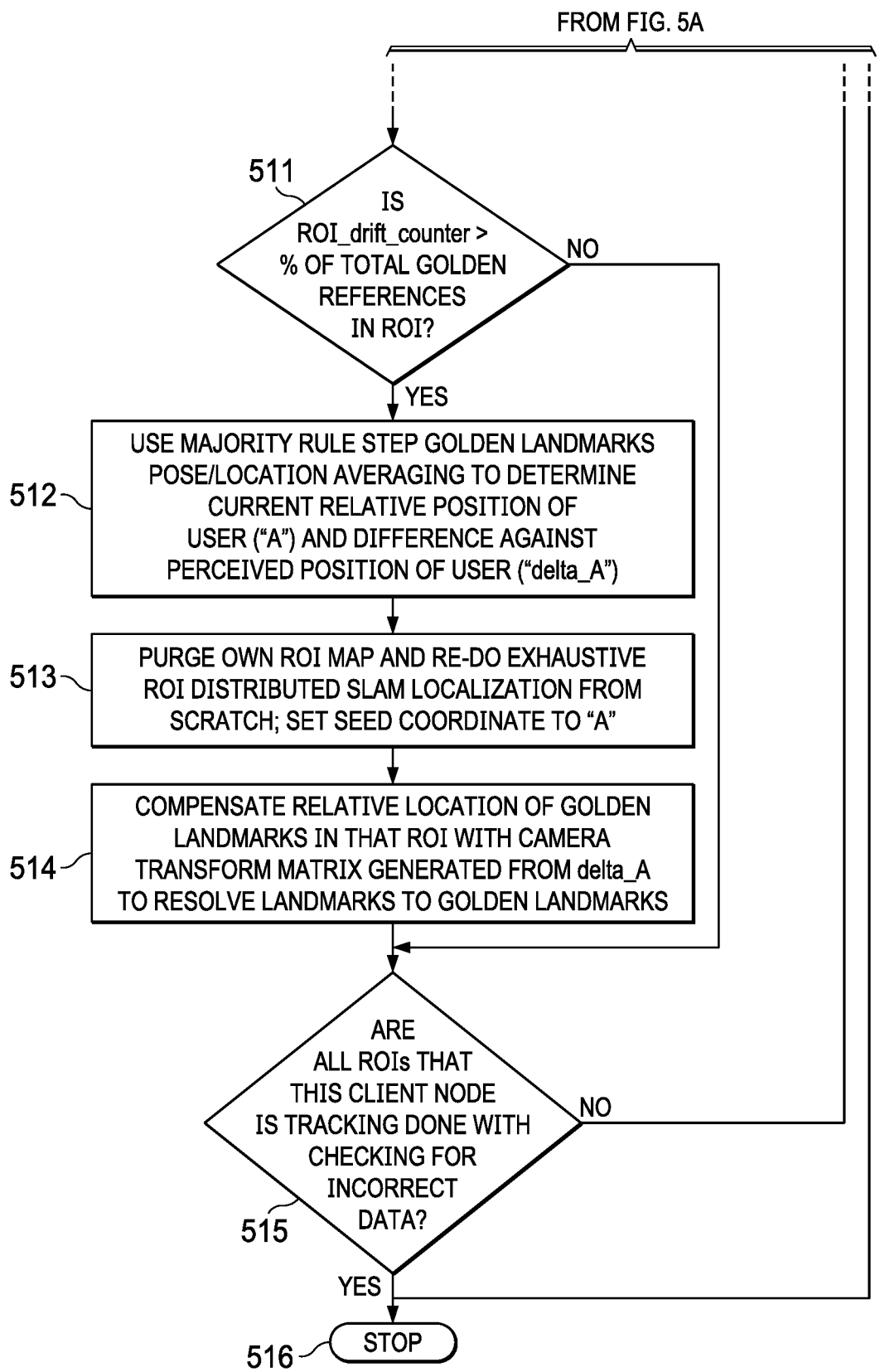

FIGS. 5A and 5B illustrate an example of method 500 for resolving incorrect distributed SLAM data in edge cloud architectures. In some embodiments, method 500 may be performed by xR application 401 in cooperation with distributed SLAM module 403, under execution by an instance of IHS 103 coupled to HMD 102.

Method 500 begins at block 501. At block 502, host IHS 103 may receive HMD 102's pose information 502 (e.g., location and orientation), for example, from an IMU built into HMD 102. Block 502 may then periodically transmit the HMD's relative pose and the coordinates of its golden references to other IHSs coupled to other co-located HMDs. For instance, as part of a mesh network, the host IHS may periodically transmit wireless beacons containing pose/golden references for HMD 102.

At block 504, method 500 decodes pose and gold landmark information received from other IHS instances, for example, via IHS-to-IHS communications. As such, IHS 103 may collect and process ROIs/landmarks (e.g., coordinates, labels, etc.), including golden references, from other HMDs that are not necessarily in direct communications with IHS 103.

In various embodiments, other IHS instances from which other landmarks or golden references are received may be selected based upon their locations with respect to an edge cloud architecture. For example, in some cases, HMD 102 may have minimum latency requirements, depending upon its context (e.g., average speed of movement of HMD 102 in environment 100A) and/or type of xR application (e.g., gaming or productivity applications).

If an xR application requires fast processing, or if HMD 102 has a high speed of movement in room 100A, a threshold round-trip latency may be set such that only other IHS instances that meet that latency requirement are selected (e.g., co-located or edge servers, to the exclusion of cloud servers). In other cases, HMD 102's latency requirement may be established based upon historical or learned behavior, so faster moving golden references (as determined by prior SLAM data) may be suitable for being replaced by landmarks or golden references produced with lower round-trip latency. Conversely, slower moving landmarks or golden references may be replaced by other landmarks or golden references produced with greater round-trip latency.

Additionally, or alternatively, HMD 102 may have minimum computation or processing requirements, again, depending upon context or xR application. If the xR application or identified golden references require intensive processing (e.g., machine learning and/or object recognition), a threshold compute capability may be set such that only other IHS instances that meet that requirement are selected (e.g., edge servers or cloud servers, to the exclusion of co-located servers).

At block 505, method 500 may perform distributed SLAM and resolve conflicting observations or instances of the same golden references, as those golden references are produced by the other clients. For example, block 505 may add different observations of the same golden references to a majority rule candidate list.

Block 506 sets a drift counter to an initial value (e.g., zero) for an ROI of HMD 102. The drift counter can then be used to keep track of how many golden references detected in HMD 102's ROI are incorrect. Particularly, at block 507, method 500 applies a majority rule whereby two or more other instances of the same golden reference are received and evaluated, including EKF data from respective client nodes. Then, block 506 determines whether the location of HMD's 102 golden reference(s) is/are within an accuracy tolerance (x %) of the other instances of the same golden reference(s).

For example, block 507 may use pose information obtained from each HMD to transform the coordinates of those HMD's golden references to a same coordinate system as HMD's 102 golden references. Distances between the HMD's 102 golden references and each other instance of the same golden reference may be calculated, averaged, and compared against a threshold. At block 508, if the distance is greater than the threshold, then block 509 increments the drift counter by 1. Block 510 returns control to block 507 if not all of HMD's 102 golden references have yet been accounted for.

At block 511, method 500 determines whether the current value of the drift counter is greater than a threshold value (e.g., x % of total number of Golden References in the ROI). If not, block 515 returns control to block 506 to the extent there are more ROIs to be analyzed for incorrect data for HMD 102. If the current value of the drift counter is greater than the threshold value, block 512 uses average pose and locations of HMD 102, as determined by other client nodes, to determine a current relative position of HMD 102 ("A") and to calculate a difference between the current relative position of HMD 102 and a self-observed position of HMD 102 ("delta_A").

Block 513 may cause distributed SLAM module 403 to purge its own current ROI map and to perform an exhaustive ROI distributed SLAM localization (e.g., from scratch), using "A" as a seed coordinate. Then, block 514 may compensate the relative location of golden landmarks in the ROI with a camera transform matrix generated from delta_A. Method 500 ends at block 516.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive Simultaneous Localization and Mapping (SLAM) data obtained by a first Head-Mounted Device (HMD), wherein the SLAM data comprises a first plurality of landmarks usable to produce a first map of a physical space for the first HMD;
select a first set of golden references among the first plurality of landmarks;
select a second HMD over at least one other co-located HMD based upon at least one of: a latency parameter or a computation parameter associated with a second IHS coupled to the second HMD;
receive, from the second IHS, a second set of golden references selected among a second plurality of landmarks usable to produce a second map of the physical space for the second HMD, wherein the second IHS is a co-located IHS, an edge server, or a cloud server;
determine that a first instance of a given golden reference in the first set of golden references matches a second instance of the given golden reference in the second set of golden references; and
in response to the first and second instances of the given golden reference being distant from each other by a threshold value, produce a new first map of the physical space for the first HMD.

2. The IHS of claim 1, wherein the SLAM data comprises landmark data found in a Region of Interest (ROI) within an infrared (IR) or near-IR (NIR) frame captured via a camera mounted on the first HMD.

3. The IHS of claim 1, wherein to select the first set of golden references, the program instructions, upon execution, cause the IHS to identify one or more IR markers captured in a Region-of-Interest (ROI) overlap between the first and second HMDs.

4. The IHS of claim 1, wherein to select the first set of golden references, the program instructions, upon execution, cause the IHS to perform an object recognition operation in a Region-of-Interest (ROI) overlap between the first and second HMDs.

5. The IHS of claim 1, wherein to determine that the first and second instances of the given golden references match, the program instructions, upon execution, further cause the IHS to transform a position of the second instance of the given golden reference into a coordinate system of the first HMD using a pose of the second HMD.

6. A hardware memory having program instructions stored thereon that, upon execution by an Information Handling System (IHS), cause the IHS to:
receive Simultaneous Localization and Mapping (SLAM) data obtained by a first Head-Mounted Device (HMD), wherein the SLAM data comprises a first plurality of landmarks usable to produce a first map of a physical space for the first HMD;
select a first set of golden references among the first plurality of landmarks;
receive, from a second IHS coupled to a second HMD, a second set of golden references selected among a second plurality of landmarks usable to produce a second map of the physical space for the second HMD;
determine that a first instance of a given golden reference in the first set of golden references matches a second instance of the given golden reference in the second set of golden references;
in response to the first and second instances of the given golden reference being separated from each other by a threshold distance, increase a count of incorrect golden references; and
in response to the count of incorrect golden references being greater than a threshold value, produce a new first map of the physical space for the first HMD.

7. The hardware memory of claim 6, wherein the second IHS is a co-located server in response to the first HMD having a first latency requirement, wherein the second IHS is an edge server in response to the first HMD having a second latency requirement smaller than the first latency requirement, or wherein the second IHS is a cloud server in response to the first HMD having a third latency requirement smaller than the second latency requirement.

8. The hardware memory of claim 6, wherein the second IHS is a co-located server in response to the first HMD having a first compute requirement, wherein the second IHS is an edge server in response to the first HMD having a second compute requirement greater than the first compute requirement, or wherein the second IHS is a cloud server in response to the first HMD having a third compute requirement greater than the second compute requirement.

9. The hardware memory of claim 6, wherein the second IHS is a co-located server in response to the first HMD moving with a first speed, wherein the second IHS is an edge server in response to the first HMD moving with a second speed smaller than the first speed, or wherein the second IHS is a cloud server in response to the first HMD moving with a third speed smaller than the second speed.

10. The hardware memory of claim 6, wherein the second IHS is a co-located server in response to the first instance of the given golden reference having moved with a first speed in previous SLAM data, wherein the second IHS is an edge server in response to the first instance of the given golden reference having moved with a second speed smaller than the first speed in previous SLAM data, or wherein the second IHS is a cloud server in response to the first instance of the given golden reference having moved with a third speed smaller than the second speed in the previous SLAM data.

11. The hardware memory of claim 6, wherein the program instructions, upon execution, further cause the IHS to:
receive, from a third IHS coupled to a third HMD, a third set of golden references selected among a third plurality of landmarks usable to produce a third map of the physical space for the third HMD;

identify a third instance of the given golden reference in the third set of golden references; and
increase the count of incorrect golden references, in part, in response to the first and third instances of the given golden reference being separated from each other by the threshold distance.

12. The hardware memory of claim 11, wherein the program instructions, upon execution, further cause the IHS to determine, based upon the second and third sets of golden references, a current position of the first HMD.

13. The hardware memory of claim 11, wherein the program instructions, upon execution, further cause the IHS to:
determine, a difference between: (i) the current position of the first HMD; and (ii) a position of the first HMD as detected by the first HMD; and
compensate the location of newly selected golden landmarks used to produce the new first map of the physical space based on the difference.

14. A method, comprising:
receiving Simultaneous Localization and Mapping (SLAM) data obtained by a first Head-Mounted Device (HMD), wherein the SLAM data comprises a first plurality of landmarks usable to produce a first map of a physical space for the first HMD;
selecting a first set of golden references among the first plurality of landmarks;
receiving, from a second IHS coupled to a second HMD, a second set of golden references selected among a second plurality of landmarks usable to produce a second map of the physical space for the second HMD;
determining that a first instance of a given golden reference in the first set of golden references matches a second instance of the given golden reference in the second set of golden references;
in response to the first and second instances of the given golden reference being separated from each other by a threshold distance, increasing a count of incorrect golden references;
in response to the count of incorrect golden references being greater than a threshold value, producing a new first map of the physical space for the first HMD;
identifying a difference between: (i) a current position of the first HMD, determined based upon the second and third sets of golden references, and (ii) a position of the first HMD as detected by the first HMD; and
compensating the location of newly selected golden landmarks based on the difference.

15. The method of claim 14, wherein the second IHS is a co-located server in response to the first HMD having a first latency requirement, wherein the second IHS is an edge server in response to the first HMD having a second latency requirement, or wherein the second IHS is a cloud server in response to the first HMD having a third latency requirement.

16. The method of claim 14, wherein the second IHS is a co-located server in response to the first HMD having a first compute requirement, wherein the second IHS is an edge server in response to the first HMD having a second compute requirement, or wherein the second IHS is a cloud server in response to the first HMD having a third compute requirement.

17. The method of claim 14, wherein the second IHS is a co-located server in response to the first HMD moving with a first speed, wherein the second IHS is an edge server in response to the first HMD moving with a second speed, or wherein the second IHS is a cloud server in response to the first HMD moving with a third speed.

18. The method of claim 14, wherein the second IHS is a co-located server in response to the first instance of the given golden reference having moved with a first speed in previous SLAM data, wherein the second IHS is an edge server in response to the first instance of the given golden reference having moved with a second speed in previous SLAM data, or wherein the second IHS is a cloud server in response to the first instance of the given golden reference having moved with a third speed in previous SLAM data.

* * * * *